United States Patent
Lim et al.

(10) Patent No.: US 12,341,167 B2
(45) Date of Patent: Jun. 24, 2025

(54) METHOD FOR RECYCLING ELECTRODE SCRAPS, AND METHOD FOR MANUFACTURING ELECTRODE BY USING SAME

(71) Applicant: LG ENERGY SOLUTION, LTD., Seoul (KR)

(72) Inventors: Jun-Muk Lim, Daejeon (KR); Joo-Yul Baek, Daejeon (KR); Hee-Seok Song, Daejeon (KR); Seong-Keun Jang, Daejeon (KR); Woo-Ha Kim, Daejeon (KR); Sang-Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 790 days.

(21) Appl. No.: 17/603,152
(22) PCT Filed: Jul. 14, 2020
(86) PCT No.: PCT/KR2020/009260
§ 371 (c)(1),
(2) Date: Oct. 12, 2021
(87) PCT Pub. No.: WO2021/029545
PCT Pub. Date: Feb. 18, 2021

(65) Prior Publication Data
US 2022/0200075 A1    Jun. 23, 2022

(30) Foreign Application Priority Data
Aug. 13, 2019    (KR) .................. 10-2019-0098995

(51) Int. Cl.
*H01M 10/54*    (2006.01)
*H01M 4/02*    (2006.01)
*H01M 4/62*    (2006.01)

(52) U.S. Cl.
CPC ........... *H01M 10/54* (2013.01); *H01M 4/623* (2013.01); *H01M 4/625* (2013.01); *H01M 2004/028* (2013.01)

(58) Field of Classification Search
CPC ................. H01M 4/623; H01M 4/625; H01M 2004/028; H01M 4/13; H01M 4/04; H01M 4/139; B07B 2201/04; B07B 13/04
See application file for complete search history.

(56) References Cited

U.S. PATENT DOCUMENTS

| 6,180,278 B1 | 1/2001 | Prickett et al. |
| 2013/0266855 A1 | 10/2013 | Kim et al. |
| 2020/0335781 A1* | 10/2020 | Oshita ................... H01M 4/525 |

FOREIGN PATENT DOCUMENTS

| CN | 101183740 A | 5/2008 |
| CN | 105552468 A | 5/2016 |

(Continued)

OTHER PUBLICATIONS

Extended European Search Report dated May 12, 2022 issued by the European Patent Office in corresponding European Patent Application No. 20851987.6.

(Continued)

*Primary Examiner* — Adam A Arciero
(74) *Attorney, Agent, or Firm* — Morgan, Lewis & Bockius LLP

(57) ABSTRACT

Provided are a reuse method of electrode scrap and a method of fabricating a recycled electrode using the same. The reuse method of electrode scrap of the present disclosure includes (a) dry milling electrode scrap remaining after punching an electrode sheet including an active material layer on a current collector to obtain milled products; and (b) screening active material layer flakes from current collector fragments in the milled products by sieving the milled products, and collecting the screened active material layer flakes to obtain reusable particles.

12 Claims, 14 Drawing Sheets

(56) References Cited

FOREIGN PATENT DOCUMENTS

| | | |
|---|---|---|
| CN | 109687051 A | 4/2019 |
| EP | 0 948 076 A1 | 10/1999 |
| JP | H10-211446 A | 8/1998 |
| JP | WO2012/169073 A1 | 12/2012 |
| JP | 2013-146701 A | 8/2013 |
| JP | 2014-194873 A | 10/2014 |
| JP | 2014-199774 A | 10/2014 |
| JP | 2015-195129 A | 11/2015 |
| JP | 2018-078024 A | 5/2018 |
| KR | 10-2012-0094622 A | 8/2012 |
| KR | 10-2012-0126946 A | 11/2012 |
| KR | 10-2014-0085768 A | 7/2014 |
| KR | 10-2015-0075200 A | 7/2015 |
| KR | 10-2015-0121729 A | 10/2015 |
| KR | 10-2018-0042641 A | 4/2018 |
| WO | 2016/008813 A1 | 1/2016 |
| WO | WO-2019087492 A1 * | 5/2019 ........ H01M 10/0525 |

OTHER PUBLICATIONS

International Search Report (with partial translation) and Written Opinion issued in corresponding International Patent Application No. PCT/KR2020/009260, dated Oct. 27, 2020.

* cited by examiner

METHOD FOR RECYCLING ELECTRODE SCRAPS, AND METHOD FOR MANUFACTURING ELECTRODE BY USING SAME

TECHNICAL FIELD

The present disclosure relates to a resource reuse method in the fabrication of a lithium secondary battery. More particularly, the present disclosure relates to a method of recycling the waste discarded after punching an electrode plate and a method of fabricating a new electrode using resources obtained thereby. The present application claims the benefit of Korean Patent Application No. 10-2019-0098995 filed on Aug. 13, 2019 with the Korean Intellectual Property Office, the disclosure of which is incorporated herein by reference in its entirety.

BACKGROUND ART

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles that work on electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to recycle invaluable metals from lithium secondary batteries discarded after the shelf life has expired. The inventors paid attention to recycling the resources from the wastes remaining after punching the electrode plate such as the positive electrode plate or the negative electrode plate.

The positive electrode is taken as an example. Currently, the lithium secondary battery is fabricated by coating a positive electrode slurry including a positive electrode active material, a conductive material, a binder and a solvent on a long sheet-type positive electrode current collector 10 such as an aluminum foil, as shown in FIG. 1, to form a positive electrode active material layer 20, manufacturing a positive electrode sheet 30, and punching a positive electrode plate 40 to a predetermined size. The residual after punching is discarded as positive electrode scrap 50. If the positive electrode active material is recycled and reused from the positive electrode scrap 50, it will be very desirable in the industrial-economic and environmental aspects.

DISCLOSURE

Technical Problem

The present disclosure is directed to providing a reuse method of electrode scrap.

The present disclosure is further directed to providing a method of fabricating an electrode using the resources obtained by the method.

Technical Solution

To solve the problem, a reuse method of electrode scrap of the present disclosure includes (a) dry milling electrode scrap remaining after punching an electrode sheet including an active material layer on a current collector to obtain milled products; and (b) screening active material layer flakes from current collector fragments in the milled products by sieving the milled products, and collecting the screened active material layer flakes to obtain reusable particles.

According to the reuse method of electrode scrap of the present disclosure, it should be noted that the reusable particles are only obtained by dry milling and screening by sieving.

In the present disclosure, the dry milling preferably uses any one of a pin-mill, a disc-mill, a cutting-mill and a hammer-mill.

In terms of recycling ratio and electrode properties, the (b) preferably includes separating the active material layer flakes from the current collector fragments in the milled products stepwise according to the size by sieving the milled products using a plurality of sieves having different mesh sizes stepwise in a sequential order, and collecting the active material layer flakes from sieving active material layer flakes of a smallest size and at least one of the steps of sieving active material layer flakes of a larger size to obtain the reusable particles.

To separate the active material layer flakes from the current collector fragments in the milled products stepwise according to the size, a plurality of sieves having a gradual decrease in mesh size from top to bottom may be stacked, the milled products may be fed into the uppermost sieve, and screening may be performed under vibration applied to all the sieves by a vibrating motor.

The present disclosure further provides a method of fabricating an electrode using the resources obtained by the reuse method of electrode scrap. This electrode is referred to as a recycled electrode. The electrode is fabricated by manufacturing an electrode sheet using the reusable particles obtained by the reuse method of electrode scrap or punching an electrode plate therefrom. In particular, the reusable particles are used to fabricate a new electrode, another electrode, i.e., the recycled electrode, without adjusting the composition, or in combination with the same slurry as the slurry used to form the active material layer.

In particular, the dry milling preferably uses a pin-mill equipped with a screen having the opening size of 0.1 to 1.9 mm. It is desirable to screen the active material layer flakes of more than 0 um and 100 um or less to obtain the reusable particles in terms of recycling ratio and electrode properties maintenance.

In addition, the present disclosure provides an electrode which is a positive electrode fabricated by the method of fabricating a recycled electrode according to the present disclosure. The electrode includes a positive electrode current collector and a positive electrode active material layer formed on the positive electrode current collector.

Here, the positive electrode active material layer may include a positive electrode active material, a conductive material and a binder, the conductive material may include at least one of carbon black or carbon nanotubes, and the binder may be polyvinylidene fluoride with or without functional groups.

Advantageous Effects

According to the present disclosure, it is possible to obtain reusable particles only by dry milling and screening by sieving, resulting in a very simple process and cost reduction.

The present disclosure obtains reusable particles by separating an active material layer from electrode scrap in the form of flakes by a mechanical method using dry milling equipment and screening equipment, resulting in a very simple apparatus configuration for reuse. Additionally, it is possible to use the reusable particles to prepare (mix/coat) an active material slurry and an electrode directly without additional treatment, and the reuse process is straightforward and simple.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
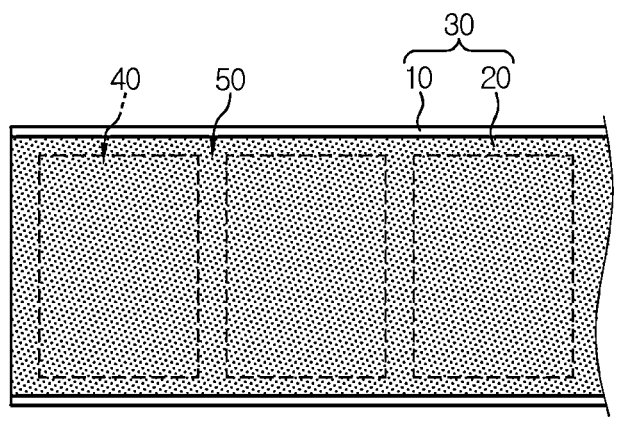
FIG. 1 is a diagram showing positive electrode scrap discarded after punching a positive electrode plate in a positive electrode sheet.

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

In the following description, a reference is made to the accompanying drawings of the present disclosure. The embodiments described in the detailed description, the drawings and the appended claims are not intended to be limiting. Other embodiments may be used without departing from the technical aspect and scope of the subject matter disclosed herein, and modifications and changes may be made. The embodiments of the present disclosure may include arrangement, substitution, combination and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art)

The present disclosure is not limited to specific embodiments described in the present disclosure. As obvious to those skilled in the art, many modifications and changes may be made thereto without departing from the technical aspects and scope of the present disclosure. In addition to those enumerated herein, functionally equivalent methods will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional reuse process of an active material is mainly aimed at reusing invaluable metal (nickel, cobalt, manganese) in an active material of a lithium secondary battery of which performance degrades during use, and as opposed to the conventional process, the present disclosure relates to fabrication of a lithium secondary battery using an active material mechanically recycled using electrode scrap before the fabrication of the lithium secondary battery.

In addition, the reuse process of an active material well known in the art produces a metal (direct reduction method) or a resynthesized active material from invaluable metal extracted through acid/base dissolution or melting using a reduction agent/additive, which requires an additional chemical method, causing complexity of the process and additional economical expenses. However, as opposed to the conventional process, the present disclosure verifies that there is no change in the performance of a lithium secondary battery reusing active material layer flakes obtained through dry milling and screening by sieving.

Figure 2:
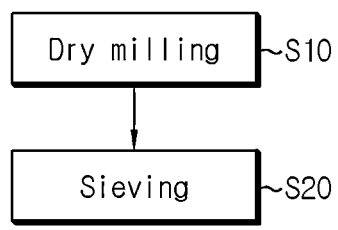
FIG. 2 is a flowchart showing a reuse method of electrode scrap of a lithium secondary battery according to the present disclosure.

Hereinafter, the reuse method of electrode scrap of a lithium secondary battery according to an embodiment of the present disclosure will be described with reference to FIG. 2. FIG. 2 is a flowchart showing the reuse method of electrode scrap of a lithium secondary battery according to the present disclosure. Referring to FIG. 2, the reuse method of electrode scrap includes dry milling (step S10) and screening by sieving (step S20).

First, electrode scrap is prepared. The electrode scrap is the residual after punching an electrode sheet including an active material layer on a current collector as described above with reference to FIG. 1. The electrode scrap has been discarded in the past, but is reused in the present disclosure. In particular, positive electrode scrap using invaluable metal as an active material is reused.

For example, assume that a slurry prepared by weighing $LiCoO_2$ as an active material, Super P as a conductive material and polyvinylidene fluoride (PVdF) as a binder at a weight ratio of 92:4:4, adding N-methyl pyrrolidone (NMP) and mixing them is coated on a sheet type current collector of an aluminum foil and dried in a vacuum oven of 120° C. to manufacture an electrode sheet, and positive electrode scrap remaining after punching a positive electrode plate of a predetermined size is prepared.

Subsequently, the electrode scrap is dry milled to obtain milled products (step S10).

Preferably, the dry milling uses any one of a pin-mill, a disc-mill, a cutting-mill and a hammer-mill.

The electrode scrap has the active material layer on the current collector of a metal foil such as an aluminum foil. The active material layer is formed by coating the slurry including the active material, the conductive material, the binder and the solvent, and has a structure that the active material and the conductive material are connected with the binder after solvent violation.

The dry milling breaks up the electrode scrap. In this process, the active material layer having high brittleness is separated from the current collector, and the current collector having high ductility is cut into pieces and curls up. The current collector is cut into pieces, and the active material layer loses continuity that deserves to name a layer and is cut into pieces, but the active material, the binder and the conductive material are still agglomerated in the form of flakes. The active material layer and the current collector may be separated to some extent only by dry milling through the difference of brittleness and ductility between the two. Accordingly, the active material layer is separated from the current collector while milling the electrode scrap by step S10.

Figure 3:
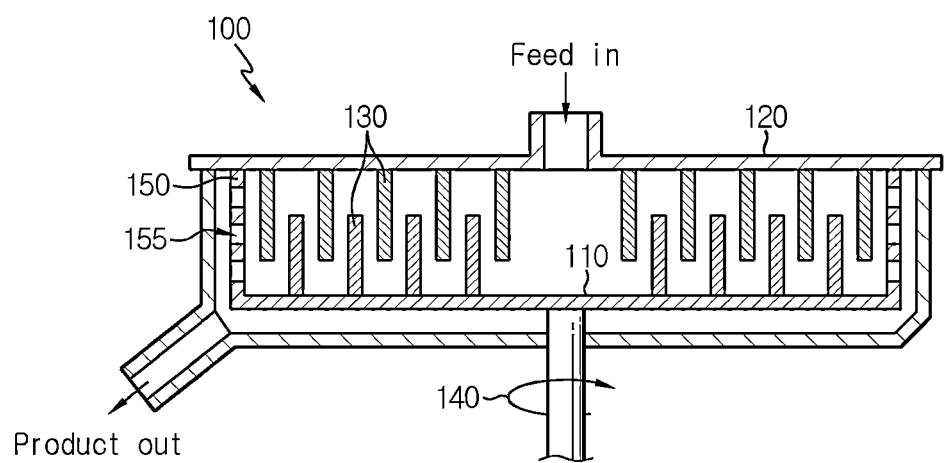
FIG. 3 is a schematic cross-sectional view of a pin-mill used to perform a dry milling step in a reuse method of electrode scrap.

FIG. 3 is a schematic cross-sectional view of the pin-mill.

The pin-mill 100, called a pin-crusher, includes a rotor 110 and a stator 120 as milling discs, and pins 130 formed in each of the rotor 110 and the stator 120 are engaged with each other. The rotor 110 rotates 140, and the stator 120 does not rotate. When a raw material is fed into the center of the pin-mill 100, the raw material is diffused along with a flow of air by the rotation 140, and milling takes place by brittleness of the raw material due to impacts with the pins 130 between the rotor 110 and the stator 120. It is possible to extract only the milled products that are small enough to pass through openings 155 formed in a screen 150 provided in the shape of a ring between the milling discs.

Figure 4:
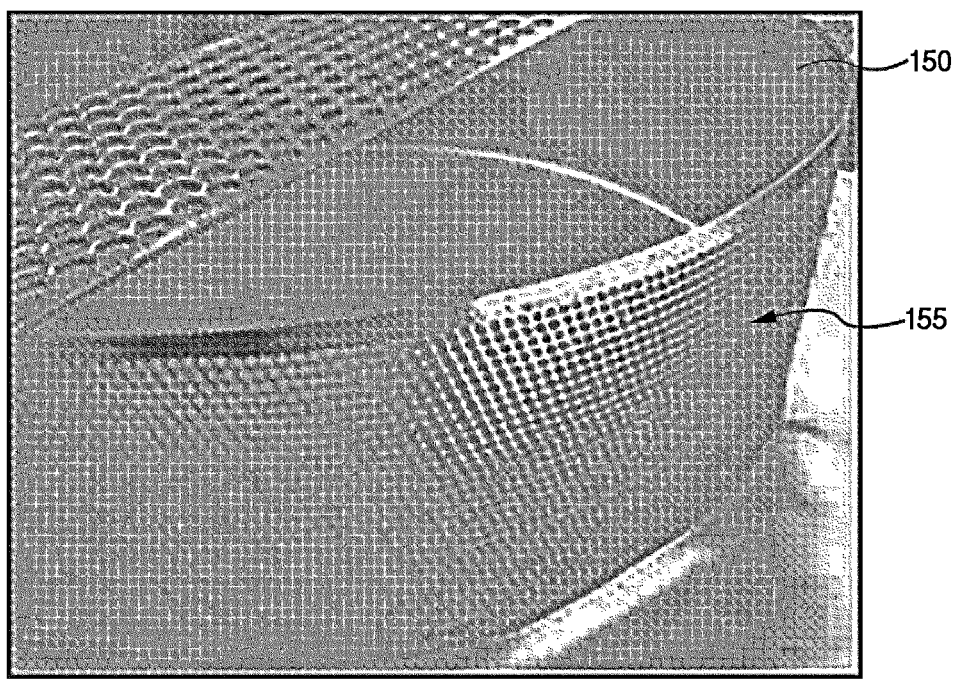
FIG. 4 is a real photographic image of a screen provided in the pin-mill of FIG. 3.

FIG. 4 is a real photographic image of the screen provided in the pin-mill of FIG. 3.

The screen 150 is a ring form of a perforated plate rolled in the shape of a loop provided between the milling discs, the rotor and the stator, and because of having the openings 155, it acts as a sort of sieve.

The size of the milled products (the current collector fragments, the active material layer flakes, their mixture, and unseparated agglomerates) to be extracted, i.e., the milling particle size may be adjusted by adjusting the shape the pins 130 and the number of pins 130 in the pin-mill 100 and the size of the openings 155 of the screen 150. In particular, an amount of reusable active material layer in the electrode scrap may be different depending on the size of the openings 155 of the screen 150, and it will be described in the following experimental example.

The disc-mill, the cutting-mill and the hammer-mill have different shapes from the pin-mill 100, but they are milling equipment that exploits brittleness in the same way as the pin-mill 100, so they may replace the pin-mill in the electrode scrap milling step of the present disclosure.

However, the ball-mill is unsuitable for dry milling. The bill-mill is difficult to effectively separate the active material layer from the current collector due to a strong force. Since the current collector is a metal and has malleability and ductility, the ball-mill is not effective in the milling for separating the active material layer. A further detailed description will be provided in the following experimental example.

Subsequently, the milled products obtained in step S10 are sieved to separate the active material layer flakes from the current collector fragments in the milled products, and the active material layer flakes are collected and reused (step S20).

In the milled products obtained through the dry milling, the active material layer and the current collector are separated to some extent, but the current collector fragments attached to the active material layer flakes may still remain in the milled products. If the active material layer milled products not completely separated from the current collector are reused, the resistance of the electrode may increase, and after a secondary battery is fabricated, a problem with cell stability may occur. Accordingly, the present disclosure proposes screening by sieving to collect the active material layer flakes completely separated from the current collector fragments.

Sieving is a dry separation method without using a solvent. Since additional costs incurred due to using solvent are not required, it does not need a solvent recovery process and an additional heat source for drying. The collected active material layer can be directly fed into the slurry mixing step, and thus a continuous process is possible.

In particular, the step S20 of screening by sieving preferably includes sieving the milled products using a plurality of sieves having different mesh sizes to separate the active material layer flakes from the current collector fragments in the milled products stepwise according to the size. When only the active material layer flakes of the smallest size are collected and reused, there is a high possibility that there are the active material without the remaining current collector, especially only active material layer components. However, it is not desirable in terms of recycling ratio. Accordingly, if there is no influence on the properties of the electrode, it is desirable to reuse the active material layer flakes collected from screening the active material layer flakes of the smallest size and at least one of the steps of screening the active material layer flakes of the larger size, in terms of recycling ratio. That is, it is important to have the screening guidelines for obtaining the maximum recycling ratio that does not affect the properties of the electrode, and the present disclosure provides the screening guidelines in the following description and experimental example.

To separate the active material layer flakes from the current collector fragments in the milled products stepwise by size, the plurality of sieves may be stacked in the descending order of mesh size from top to bottom, and after the milled products are fed into the uppermost sieve, screening may be performed under vibration applied to all the sieves by a vibrating motor.

Figure 5:
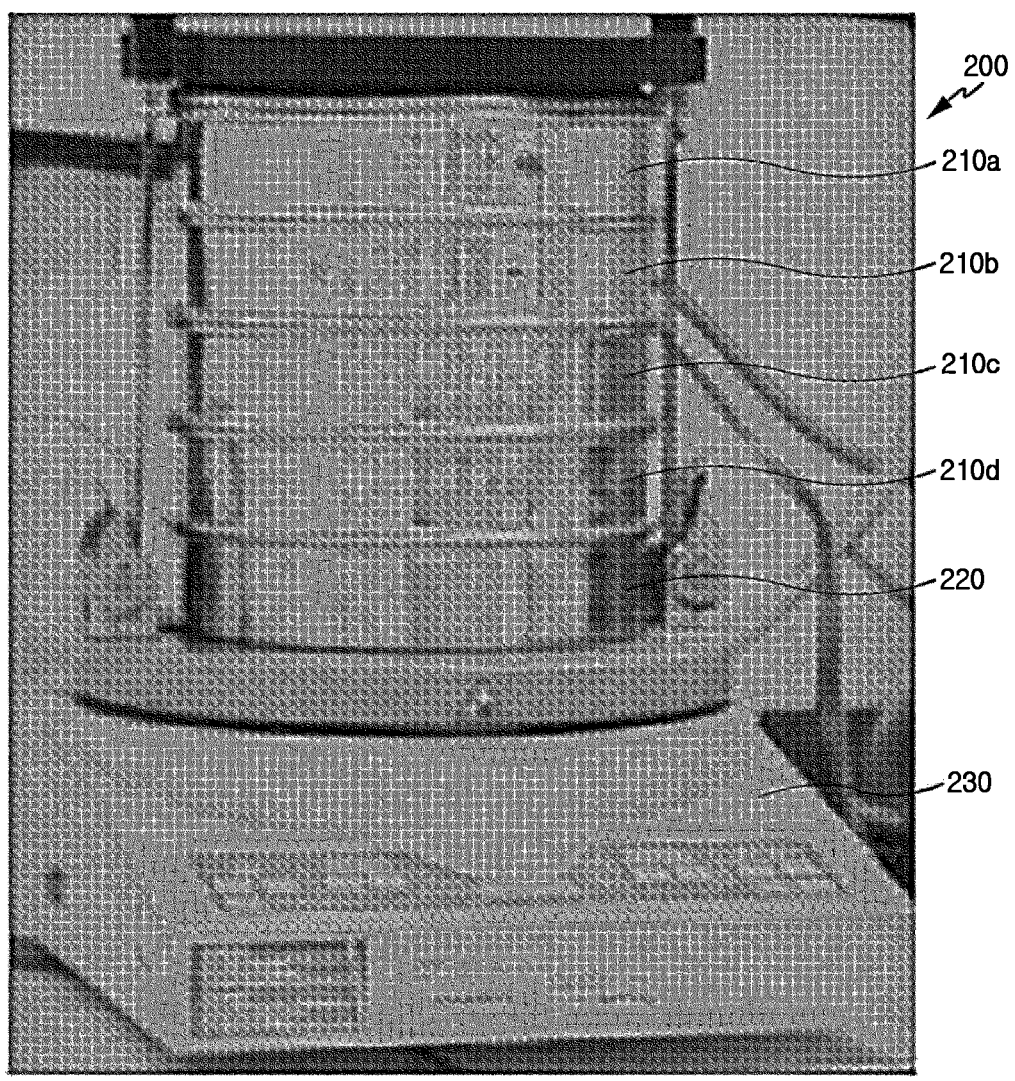
FIG. 5 is a photographic image of vibrator set up used in an experimental example of the present disclosure to perform a screening step in a reuse method of electrode scrap.

FIG. 5 is a photographic image of vibrator setup used in the experimental example of the present disclosure to perform the screening.

The vibrator 200 used is manufactured in a circular shape, and includes sieves 210a, 210b, 210c, 210d, . . . having a gradual decrease in mesh size stacked on a collection container 220 to perform screening using vibration applied to all the sieves 210a, 210b, 210c, 210d, . . . by a vibrating motor 230. The vibrator 200 has a structure that allows a raw material of under size (a smaller size than the mesh size of the sieve) to pass through the lower sieve (the lower sieve having the smaller mesh size) and a raw material of over size (a larger size than the mesh size of the sieve) to stay on the sieves 210a, 210b, 210c, 210d, . . . . by 3-dimensional vibration.

Although the experimental example as described below uses different mesh sizes of 1 to 7 steps (6 sieves and the collection container), the mesh size of the sieve and the number of sieves may vary. The mesh size of each sieve and the size range of the reusable active material layer related to the mesh size that allows the milled products to pass through the sieve may be adjusted, and a further detailed description will be provided in the following experimental example.

The reusable particles obtained through the method of FIG. 2 may be used to fabricate a recycled electrode without separate treatment. That is, when fabricating a new electrode using the reusable particles obtained by the reuse method of electrode scrap, the reusable particles may be used to fabricate another electrode without adjusting the composition, or in combination with the same slurry as the slurry used to form the active material layer. That is, the original composition of the active material, the conductive material and the binder is used.

The method of fabricating a recycled electrode and the method of fabricating a secondary battery using the same are as follows. The reusable particles may be used singly or in combination with a new active material. A ratio of new active material/reusable active material may be 0 to 99/100 to 1. In the previous example, the electrode scrap has $LiCoO_2$ as the active material, Super P as the conductive material and PVdF as the binder. When the electrode scrap is reused by the method according to the present disclosure, flakes of $LiCoO_2$, Super P of PVdF are obtained. The flakes are mixed with NMP without separate treatment to prepare a slurry. The slurry may be used to fabricate an electrode.

For example, when 100% of the reusable particles is used, active material layer flakes are mixed with a solvent to prepare a slurry.

When the reusable particles are mixed with a new active material at a predetermined ratio, the reusable particles are added at a desired mix ratio to the mixture of $LiCoO_2$, Super P and PVdF of 92:4:4, followed by mixing with NMP.

The slurry prepared as described above is coated on a current collector and dried to fabricate a recycled electrode.

Figure 6:
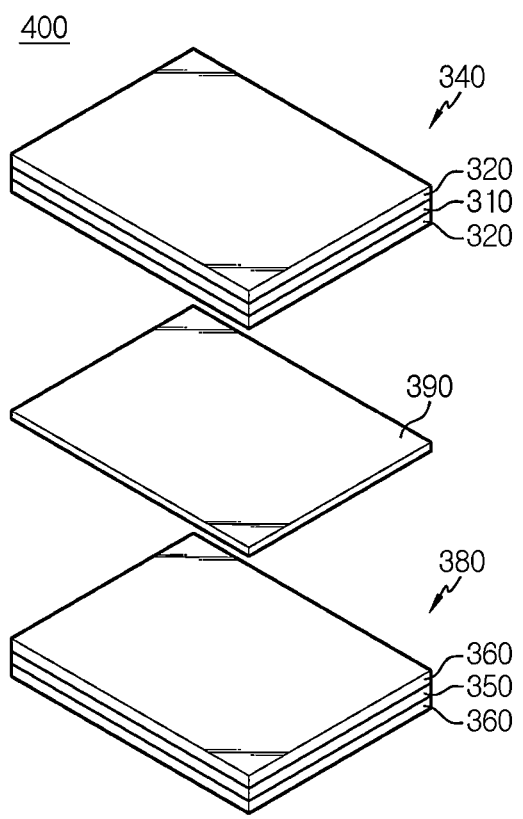
FIG. 6 shows the components of a secondary battery including a recycled electrode according to the present disclosure.

FIG. 6 shows the components of a secondary battery including the recycled electrode according to the present disclosure.

The secondary battery includes a positive electrode 340, a negative electrode 380 and a separator 390 interposed between. The stack structure of the positive electrode 340, the separator 390 and the negative electrode 380 is a unit cell. A plurality of wound or stacked unit cells may be assembled into an electrode assembly. The electrode assembly is hermetically received in a battery case together with an electrolyte of an electrolyte solution to fabricate a secondary battery 400. Preferably, the battery case may be an aluminum laminate sheet, and the secondary battery using the aluminum laminate sheet may be a pouch-type secondary battery.

The positive electrode 340 is the recycled electrode according to the present disclosure. The positive electrode 340 includes a positive electrode current collector 310 and a positive electrode active material layer 320 disposed on the positive electrode current collector 310, and the positive electrode active material layer 320 may include a positive electrode active material, a positive electrode conductive material and a positive electrode binder. The positive electrode conductive material may include carbon black or carbon nanotubes, and the positive electrode binder may include polyvinylidene fluoride with or without functional groups. Super P mentioned above in the positive electrode scrap is a sort of carbon black.

As mentioned previously, the positive electrode active material layer 320 is formed by coating with a slurry and drying, and the slurry is 100% of the reusable particles obtained through the reuse method of electrode scrap according to the present disclosure, or is prepared by mixing the reusable particles with the existing slurry.

The positive electrode current collector 310 may include any type that has conductive properties while not causing chemical changes to the corresponding battery, and is not limited to a particular type. For example, the positive electrode current collector 310 may include copper, stainless steel, aluminum, nickel, titanium, sintered carbon, or aluminum or stainless steel treated with carbon, nickel, titanium, silver on the surface. In detail, the current collector may include transition metal that adsorbs carbon well, for example, copper and nickel.

The positive electrode active material layer 320 may be disposed on the positive electrode current collector 310. The positive electrode active material layer 320 may be disposed on one surface or two surfaces of the positive electrode current collector 310. In this embodiment, the positive electrode active material layer disposed on two surfaces is shown.

The positive electrode active material may be a commonly used positive electrode active material. In detail, the positive electrode active material may include, but is not limited to, layered compounds such as lithium cobalt oxide ($LiCoO_2$) and lithium nickel oxide ($LiNiO_2$) or compounds with one or more transition metal substitution; lithium manganese oxide of Formula $Li_{1+x}Mn_{2-x}O_4$ (where x=0 to 0.33), LiMnO$_3$, LiMn$_2$O$_3$, LiMnO$_2$; lithium copper oxide (Li$_2$CuO$_2$); vanadium oxide such as LiV$_3$O$_8$, LiFe$_3$O$_4$, V$_2$O$_5$, Cu$_2$V$_2$O$_7$; Ni-site type lithium nickel oxide represented by Formula LiNi$_{1-x}$M$_x$O$_2$ (where M=Co, Mn, Al, Cu, Fe, Mg, B or Ga, x=0.01 to 0.3); lithium manganese composite oxide represented by Formula LiMn$_{2-x}$M$_x$O$_2$ (where M=Co, Ni, Fe, Cr, Zn or Ta, x=0.01 to 0.1) or Li$_2$Mn$_3$MO$_8$ (where M=Fe, Co, Ni, Cu or Zn); lithium manganese composite oxide of spinel structure represented by LiNi$_x$Mn$_{2-x}$O$_4$ (x=0.01 to 0.6); LiMn$_2$O$_4$ with partial substitution of alkali earth metal ion for Li in Formula; disulfide compounds; Fe$_2$(MoO$_4$)$_3$.

The positive electrode binder may be at least one selected from the group consisting of polyvinylidene fluoride, PVDF-co-HFP, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, ethylene-propylene-diene monomer (EPDM), sulfonated EPDM, styrene butadiene rubber (SBR), fluorine rubber, poly acrylic acid and materials having hydrogen substitution by Li, Na or Ca, and a variety of copolymers thereof.

The positive electrode conductive material may include carbon black or carbon nanotubes as well as any type that has conductive properties while not causing chemical changes to the corresponding battery, for example, graphite such as natural graphite or artificial graphite; conductive fibers such as carbon fibers or metal fibers; metal powder such as fluorocarbon, aluminum and nickel powder; conductive whiskers such as zinc oxide and potassium titanate; conductive metal oxide such as titanium oxide; conductive materials such as polyphenylene derivatives.

The negative electrode 380 may include a negative electrode current collector 350 and a negative electrode active material layer 360 disposed on one surface or two surfaces of the negative electrode current collector 350. In this embodiment, the negative electrode active material layer disposed on two surfaces is shown.

The negative electrode current collector 350 includes any type that has conductive properties while not causing chemical changes to the corresponding battery, and is not limited to a particular type. For example, the negative electrode current collector 350 may include copper, stainless steel, aluminum, nickel, titanium, sintered carbon, or aluminum or stainless steel treated with carbon, nickel, titanium, silver on the surface. In detail, the current collector may include transition metal that adsorbs carbon well, for example, copper and nickel.

The negative electrode active material layer 360 may include a negative electrode active material, a negative electrode conductive material and a negative electrode binder. The negative electrode active material may be graphite-based active material particles or silicon-based active material particles. The graphite-based active material particles may include at least one selected from the group consisting of artificial graphite, natural graphite, graphitized carbon fibers or graphitized mesocarbon microbeads, and in particular, when artificial graphite is used, the rate characteristics may be improved. The silicon-based active material particles may include at least one selected from the group consisting of Si, SiOx (0<x<2), Si—C composite and Si—Y alloy (where Y is an element selected from the group consisting of alkali metal, alkali earth metal, transition metal, group 13 elements, group 14 elements, rare earth elements and a combination thereof).

The negative electrode binder may be identical or similar to the positive electrode binder. The negative electrode conductive material may be identical or similar to the positive electrode conductive material.

The separator 390 separates the negative electrode 380 from the positive electrode 340 and provides the movement channel of lithium ions, and includes, without limitation, any type that is commonly used as separators of secondary batteries, and in particular, those having low resistance to the ion movement of the electrolyte and good impregnation with the electrolyte solution are preferable. In detail, a porous polymer film, for example, made of a polyolefin-based polymer such as ethylene homopolymer, propylene homopolymer, ethylene/butene copolymer, ethylene/hexene copolymer and ethylene/methacrylate copolymer, may be used singly or in stack. Additionally, a general porous nonwoven fabric, for example, a nonwoven fabric made of high melting point glass fibers or polyethyleneterephthalate fibers may be used. Additionally, to ensure heat resistance or mechanical strength, a coated separator including ceramics or polymers may be used, and may be selectively used with a monolayer or multilayer structure.

The electrolyte may include, but is not limited to, an organic liquid electrolyte, an inorganic liquid electrolyte, a solid polymer electrolyte, a gel polymer electrolyte, a solid inorganic electrolyte and a molten inorganic electrolyte that can be used to fabricate lithium secondary batteries.

In detail, the electrolyte may include a non-aqueous organic solvent and a lithium salt.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

In particular, among the carbonate-based organic solvents, cyclic carbonate such as ethylene carbonate and propylene carbonate is an organic solvent with high viscosity and may be desirable because of allowing favorable dissolution of the lithium salt by virtue of a high dielectric constant. More preferably, when cyclic carbonate is mixed with linear carbonate having a low viscosity and a low dielectric constant such as dimethylcarbonate and diethylcarbonate at a proper ratio, it is possible to prepare an electrolyte solution having high electrical conductivity.

The metal salt may include a lithium salt, and the lithium salt includes materials that dissolve well in the non-aqueous electrolyte solution, and for example, an anion of the lithium salt may include one selected from the group consisting of F—, Cl—, I—, NO$_3$—, N(CN)2—, BF4—, ClO4—, PF6—, (CF3)2PF4—, (CF3)3PF3—, (CF3)4PF2—, (CF3)5PF—, (CF3)6P—, CF3SO3—, CF3CF2SO3—, (CF3SO2)2N—, (FSO2)2N—, CF3CF2(CF3)2CO—, (CF3SO2)2CH—, (SF5)3C—, (CF3SO2)3C—, CF3(CF2)7SO3—, CF3CO2—, CH3CO2—, SCN— and (CF3CF2SO2)2N—.

In addition to the above-described components of the electrolyte, the electrolyte may further include, for example, at least one additive of haloalkylene carbonate-based compounds such as difluoro ethylene carbonate, pyridine, triethylphosphite, triethanolamine, cyclic ethers, ethylene diamine, n-glyme, hexatriamide phosphate, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol or aluminum trichloride, to improve the life characteristics of the battery, suppress the capacity reduction of the battery and improve the discharge capacity of the battery.

The inventors found that the reusable particles collected from the separated active material layer flakes can be used to fabricate an electrode, 100% fully or in combination with the existing active material, and a further detailed description will be provided in the following experimental example.

The reuse process of active materials well known in the art produces a metal (direct reduction method) or a resynthesized active material from invaluable metal extracted through acid/base dissolution or melting using a reducing agent/additive, which requires an additional chemical method, causing complexity of the process and additional economical expenses. However, the present disclosure is straightforward and simple since the reusable particles are only obtained by dry milling and screening by sieving, and directly used to prepare (mix/coat) an active material slurry and an electrode.

That is, the present disclosure does not perform additional thermal treatment, acid/base dissolution or melting using a reducing agent/additive on the separated active material layer flakes. The conventional reuse process of active materials includes removing the binder and the conductive material included in the active material layer to obtain only the active material, but the active material reuse of the present disclosure uses the milled and screened active material layer flakes without removing the binder and the conductive material included in the active material layer.

If additional thermal treatment is used to obtain only the active material, the resistance of the active material increases due to deformation of the active material and partial carbonization of the binder and the conductive material. However, since the present disclosure does not use additional thermal treatment, the thermal treatment cost is not required, and it is possible to avoid increased resistance or by-products. It is possible to provide economic efficiency in the time and cost aspects since the collected active material layer flakes can be directly fed into the existing slurry including the active material, the conductive material and the binder for use in the preparation of the existing active material layer.

Hereinafter, the experimental example of the present disclosure will be described in detail.

Experimental Example

Positive electrode scrap is dry milled using the pin-mill shown in FIG. 3. As described in the previous example, a positive electrode current collector is an aluminum foil, and a positive electrode active material layer is formed from a slurry prepared by weighing $LiCoO_2$ as an active material, Super P as a conductive material and PVdF as a binder polymer at a weight ratio of 92:4:4, followed by mixing with NMP.

In this instance, the experiment is performed by screening using three screens having different opening sizes. #1 screen has openings of 0.1 to 1.9 mm, #2 screen has openings of 2.0 to 4.9 mm, and #3 screen has openings of 5.0 to 10.0 mm.

In the milling of the positive electrode scrap, for each of the milled products extracted using #1 screen, the milled products extracted using #2 screen and milled products extracted using #3 screen, screening uses the vibrator as presented in FIG. 5. 1 to 7 step sieving is performed. The mesh size of the sieve reduces from top to bottom. A total of 6 sieves are stacked on the collection container, and a total of 1 to 7 sieving steps are performed from the sieve disposed at the uppermost position to the collection container disposed at the lowermost position. The mesh size of the sieve of each step is 300 um, 200 um, 100 um, 50 um, 30 um and 20 um and the collection container without mesh is used for final collection.

Table 1 shows the mesh size for each sieving step, the size of the milled products remaining on the sieve of each step after sieving, the amount of the current collector component Al in the milled products remaining on the sieve of each step, and the active material recycling ratio for each step.

TABLE 1

| Sieving step | Screen size (um) | Flake size after sieving (um) | Amount of Al (wt %) | | | Active material recycling ratio for each sieving step (%) | | |
|---|---|---|---|---|---|---|---|---|
| | | | #1 | #2 | #3 | #1 | #2 | #3 |
| 1 | 300 | ~300 | 45.10 | 30.00 | 12.2 | 6.3 | 11.0 | 48.4 |
| 2 | 200 | 300~200 | 23.00 | 0.32 | 0.11 | 1.0 | 2.6 | 2.5 |
| 3 | 100 | 200~100 | 0.36 | 0.04 | 0.02 | 11.4 | 24.1 | 15.0 |
| 4 | 50 | 100~50 | 0.06 | 0.02 | 0.02 | 21.3 | 24.2 | 11.5 |
| 5 | 30 | 50~30 | 0.05 | 0.03 | 0.03 | 12.6 | 9.0 | 5.3 |
| 6 | 20 | 30~20 | 0.06 | 0.03 | 0.02 | 29.8 | 17.5 | 5.9 |
| 7 | Final | 20~ | 0.15 | 0.05 | 0.03 | 12.2 | 6.9 | 4.7 |

The amount of Al is calculated by dividing the weight of Al included in the active material collected for each sieving step by the weight of the active material collected for each sieving step and multiplying by 100 to convert into mass % (wt %). The active material recycling ratio is calculated by subtracting the weight of Al included in the active material collected for each sieving step from the weight of the active material collected for each sieving step, dividing the total by the weight of the active material collected for each sieving step, and multiplying by 100 to convert into %.

The milled products remaining on the sieve after sieving for each step are powder, and their shape is observed with the naked eye. As the screen number goes from #3 to #1, that is, as the opening size of the screen is smaller, the electrode scrap to be milled stays longer in the pin-mill and milling is performed better, leading to smaller size. Likewise, it is found that the size of the collected powder is smaller as the screen number goes from #3 to #1. That is, it is found that the opening size of the screen affects the size of the milled products.

In particular, it is found that in the case of the screen number #3, there is a large amount of initial unseparated electrode. In this case, it is concluded that the preferable opening size of the screen is 4.9 mm or less. Accordingly, the opening size of the screen is one of factors that determine the milling condition, and may be adjusted to control the size of the collected active material layer flakes.

Additionally, in all the screen numbers #1 to #3, a large amount of current collector fragments remaining after sieving of 1 to 3 steps is observed with the naked eye, and the milled products remaining on the sieve through 1 to 3 step sieving are determined to be non-usable particles. That is, the milled products having the size of 100 um or more are non-usable particles.

The current collector fragments are not observed with the naked eye in the milled products remaining on the sieve by sieving after 4 step. Accordingly, the milled products remaining on the sieve after 4 step are determined to be screened active material layer flakes completely separated from the current collector fragments. The active material layer flakes after 4 step, that is, the milled products having the size of 100 um or less are determined to be reusable particles. As can be seen from the amount of Al in Table 1, in the sieving after 4 step, the active material is present in a higher amount than Al. The current collector fragments are separated, but presumably, some Al finely milled during milling is attached to or coated on the active material layer flakes and mixed at a trace impurity level.

Through the above results, in the case of the reusable particles (the size of the milled products of 100 um or less), the amount of active material is higher than the amount of Al. As a result of using the opening size of the screen and the mesh size of the sieve as variables, it is concluded that the size of reusable active material layer flakes after sieving is preferably 100 um or less. On the contrary, the milled products of 100 um or more should not be reused.

Figure 7:
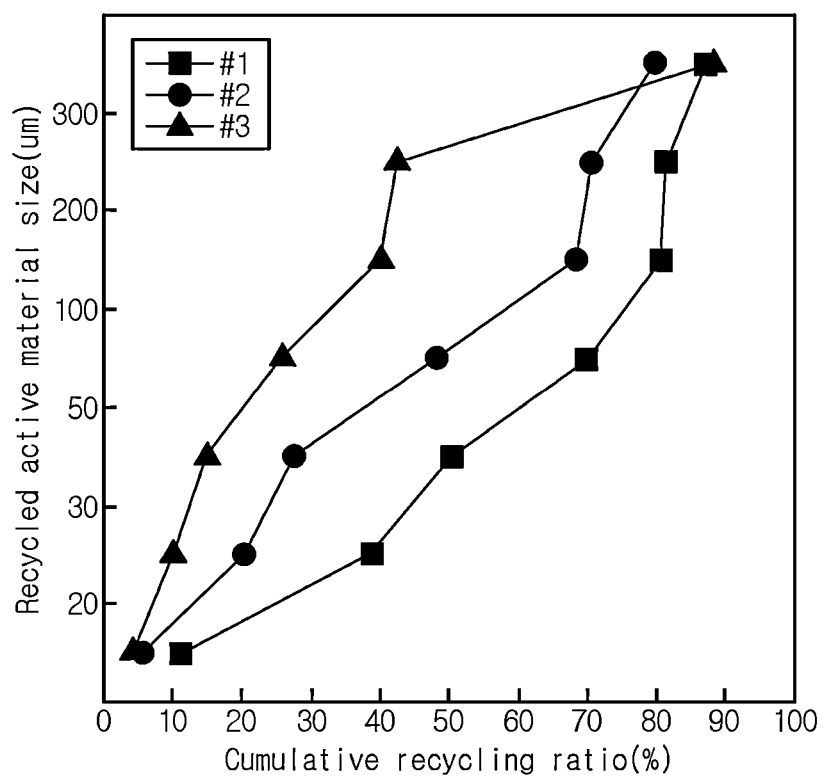
FIG. 7 is a graph showing the cumulative recycling ratio for each sieving step according to the screen type in an experimental example of the present disclosure.

FIG. 7 is a graph showing the cumulative recycling ratio for each sieving step according to the screen type in the above Table 1.

The cumulative recycling ratio is the sum of active material recycling ratios for each sieving step. It can be seen that the recycling ratio differs depending on the screen type, to be exact, the opening size of the screen.

In particular, the cumulative active material recycling ratio of the reusable active material layer flakes of 100 um or less is 70.0% in the screen number #1, 48.0% in the screen number #2, and 25.0% in the screen number #3. Accordingly, it can be seen that the screen number #1 is the most desirable in terms of recycling ratio. Among the screens used in the experiment, the screen number #1 has the smallest screen opening. That is, through the experiment results, it is concluded that it is preferred that the screen of the pin-mill used in the dry milling has the opening size of 0.1 to 1.9 mm.

Figure 8:
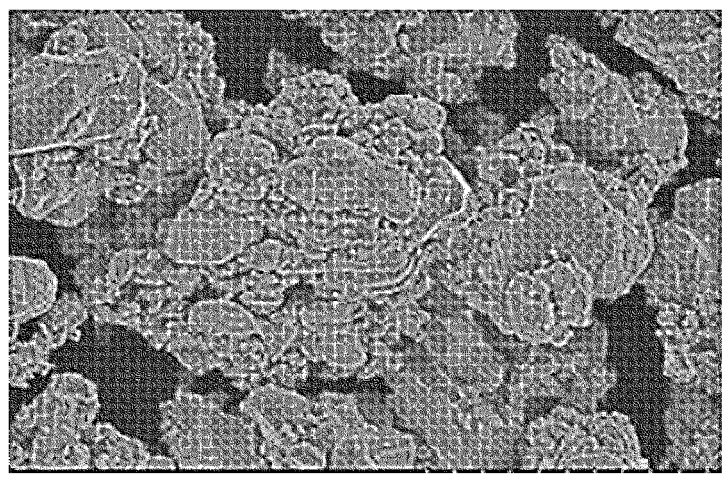
FIG. 8 is a scanning electron microscope (SEM) image of collected active material layer flakes.

FIG. 8 is a scanning electron microscope (SEM) image of the collected active material layer flakes. The collected active material exists as very small particles of a mixture of the active material, the conductive material, the binder.

Through the properties investigation of an electrode fabricated by punching an electrode sheet manufactured using the reusable particles, it is found that the reusable particles collected from the separated active material layer flakes can be used to manufacture an electrode sheet, 100% fully or in combination with the existing active material.

The experiment set is as shown in the following Table 2.

TABLE 2

| Set | Sieving step | Details |
|---|---|---|
| #1 | — | Reference electrode |
| #2 | 4~7 | 100 um or less active material layer flaks recycled electrode |
| #3 | 5~7 | 50 um or less active material layer flaks recycled electrode |
| #4 | 6~7 | 30 um or less active material layer flaks recycled electrode |

1 set is an electrode fabricated using the reference electrode, that is, a slurry including the existing active material. #2 set is an electrode fabricated by collecting the active material layer flakes collected in sieving of 4 to 7 steps according to the experimental example of the present disclosure and reusing the active material layer flakes of more than 0 um and 100 um or less in combination with the existing slurry. #3 set is an electrode fabricated by collecting the active material layer flakes of sieving of 5 to 7 steps and reusing the active material layer flakes of more than 0 um and 50 um or less in combination with the existing slurry, and set #4 is an electrode fabricated by collecting the active material layer flakes of sieving of 6 and 7 steps and reusing the active material layer flakes more than 0 um and 30 um or less in combination with the existing slurry.

An adhesive strength experiment and a TGA experiment are performed on each set.

The adhesive strength experiment is performed by the 90° peel test commonly used in the art using LLOYD LS-5 tester at the tensile rate of 5 mm/s condition.

Figure 9:
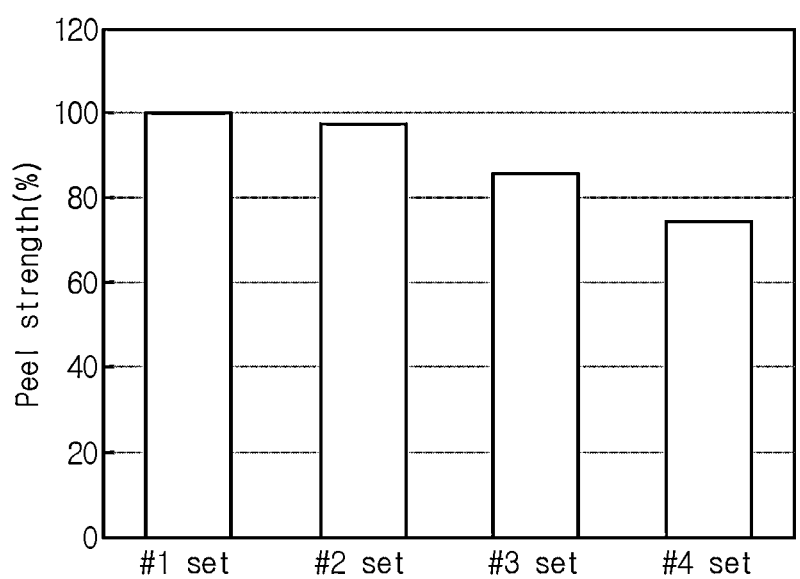
FIG. 9 is a graph showing the adhesive strength of a reference electrode and an electrode fabricated using collected active material layer flakes.

FIG. 9 is a graph showing the adhesive strength of the electrode.

The adhesive strength of #1 set is set to 100%, and the adhesive strength of the remaining sets is calculated as a relative ratio.

As a result of the experiment, #2 set shows a similar adhesive strength level to #1 set. #3 set and #4 set have the narrower particle size distribution of the collected active material layer flakes due to the smaller reusable active material range than #2. In #3 set and #4 set, it is found that the adhesive strength of the electrode is lower. Basically, in the milling and separation process, the milled products of the electrode exist as active material layer flakes of a mixture of the active material/the conductive material/the binder. However, as the sieve number increases (as the sieving size is smaller), most of the milled products of the electrode exist as the active material of small size separated from the flakes. As the sieve number increases, flakes containing a smaller amount of binder are collected, and when only the reusable active material particles of the high sieving step are used, the electrode fabricated using the reusable active material may have poor properties due to the low amount of binder in the milled products of the electrode. In particular, it can be seen that #2 set is preferable in terms of adhesive strength. #2 set has a broader particle size distribution and includes a mixture of large particles and small particles. When active material layer flakes having the size ranging from the smallest size to 100 um or less are used (#2), the adhesive strength is higher than when using active material layer flakes having the size ranging from the smallest size to 50 um or less (#3 set).

Accordingly, it can be seen that in terms of recycling ratio or adhesive strength, active material layer flakes collected from screening active material layer flakes of the smallest size and at least one of the steps of screening active material layer flakes of the larger size are reusable particles, and accordingly it can be seen that it is advantageous to include a plurality of higher level of steps.

Figure 10:
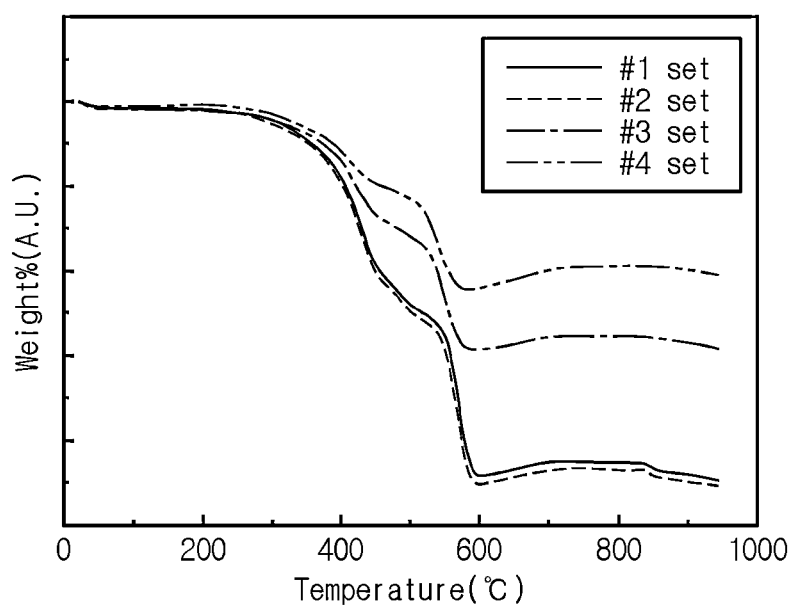
FIG. 10 is a thermogravimetric analysis (TGA) graph of a reference electrode and an electrode fabricated using collected active material layer flakes.

FIG. 10 is a TGA graph. The weight changes with the increasing temperature are observed. The composition of each electrode can be seen from TGA. As a result of the observation, FIG. 10 shows that especially #2 set has the similar result to #1 set. It is found that when active material layer flakes collected in the sieving steps 4 to 7 are reused, the composition of the active material, the conductive material and the binder is on the similar level to the reference. Accordingly, it is concluded that #2 set is best suitable for reuse. It is found that when active material layer flakes of the sieving step of a specific range or less are reused like #3 set or #4 set, the amounts of the conductive material and the binder are lower than the reference. Accordingly, it can be seen that including a plurality of higher level of steps is desirable in terms of recycling ratio or adhesive strength as well as composition.

Verification through the experimental example as described above will effectively work as the above-described screening guidelines.

The reusable particles may be reused alone or in combination with a new active material. The ratio of new active material/reusable active material in the fabricated electrode may be 0 to 99/100 to 1.

Figure 11:
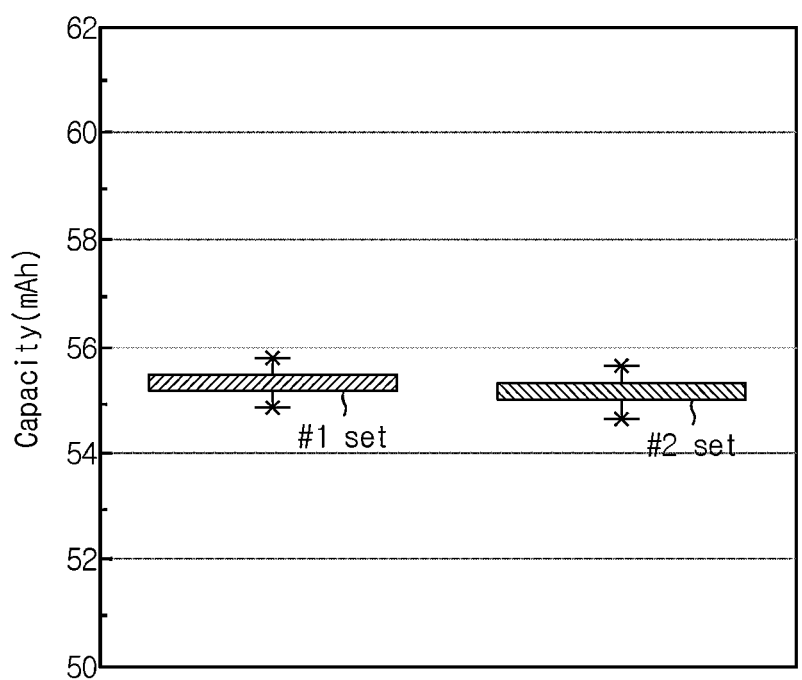
FIG. 11 is a graph showing the initial capacity of a monocell including a reference electrode and a monocell including an electrode fabricated using collected active material layer flakes.
Figure 12:
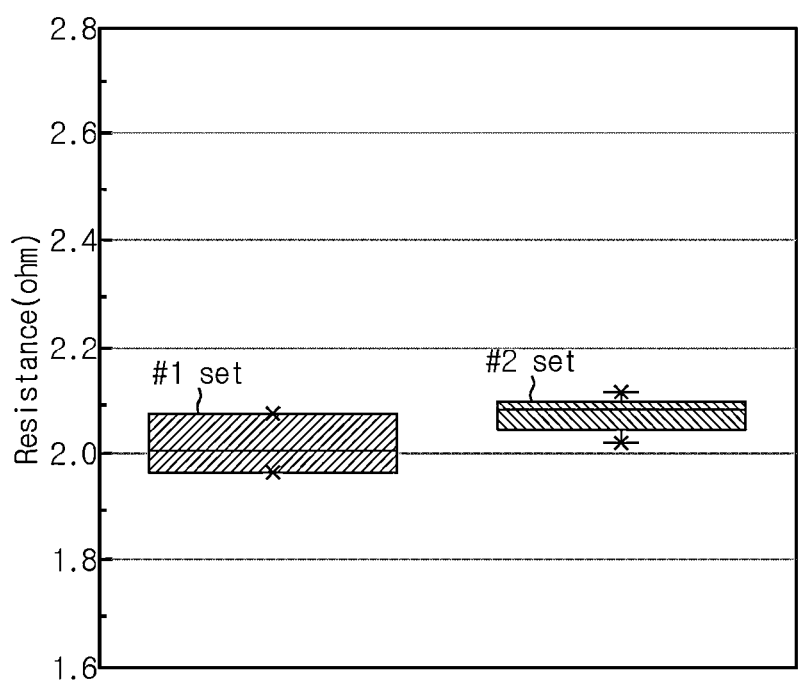
FIG. 12 is a graph showing the resistance performance of a monocell including a reference electrode and a monocell including an electrode fabricated using collected active material layer flakes.

Comparison of initial capacity and resistance performance is carried out between a monocell fabricated using the electrode (positive electrode) of #1 set and a monocell fabricated using the electrode (positive electrode) of #2 set, and each result is shown in FIGS. 11 and 12. The monocell is a unit cell including a positive electrode, a negative electrode and a separator.

In this experimental example, as mentioned previously, the positive electrode has an active material layer of $LiCoO_2$, Super P and PVdF mixed at the weight ratio of 92:4:4, the negative electrode has an active material layer of mesocarbon microbead (MCMB), super P and PVdF mixed at 92:2:6 on a copper foil, polyethylene is used for the separator, and an ethylenecarbonate (EC) and dimethylcarbonate (DMC) solution of the volume ratio of 1:1 containing 1 M $LiPF_6$ is used for the electrolyte.

In this experimental example, according to the resistance measurement method, voltage is applied across the terminals using Hioki BT3562 battery hitester, and at this time, the current between the terminals is measured, and calculation is performed from the relational equation of V(voltage)=I(current)R(resistance). The applied voltage is 6V.

It is evaluated that the monocell fabricated using the electrode of #1 set and the monocell fabricated using the electrode of #2 set have similar initial capacity of 55 mAh. That is, it is found that a lithium secondary battery fabricated reusing active material layer flakes has the initial capacity that is almost similar to a lithium secondary battery fabricated using a new active material.

From the resistance performance results showing the resistance of the cell measured at SOC 50%, it can be seen that the resistance of the monocell fabricated using the electrode of #1 set is 2.0 ohm, and the resistance of the monocell fabricated using the electrode of #2 set is about 2.08 ohm, and thus there is no significant difference between them.

Meanwhile, the comparison between the pin-mill and the ball-mill used for dry milling is carried out. For each case, the resistance of powder obtained after milling and screening, and the resistance of an electrode layer formed using the powder are measured and shown in FIGS. 13 and 14.

Figure 13:
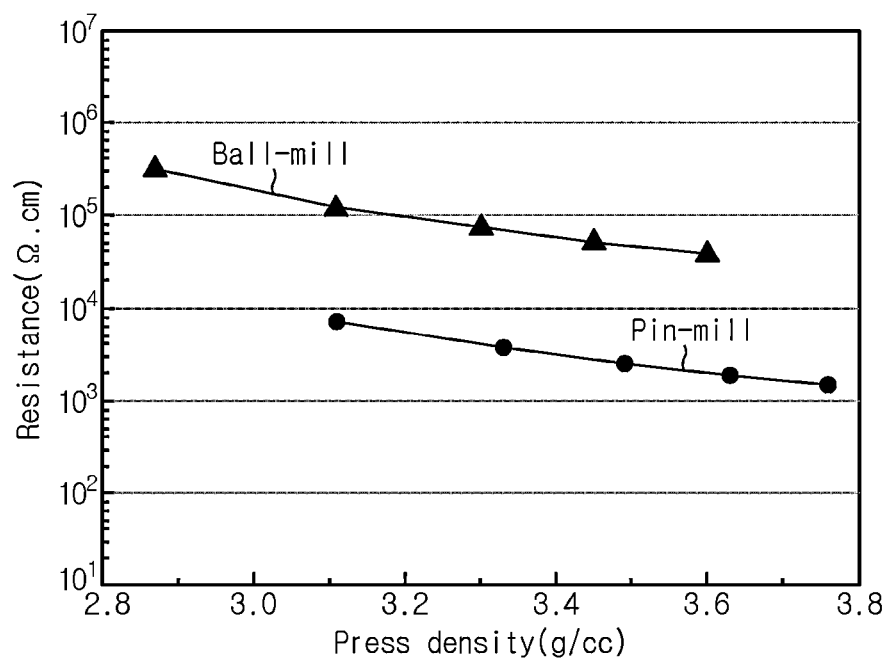
FIG. 13 is a graph showing the comparison of powder resistance when a pin-mill and a ball-mill are used for dry milling.

FIG. 13 shows the resistance ($\Omega$cm) as a function of press density (g/cc). As predicted, with the increasing press density of the powder, the resistance tends to decrease. In the powder of the same press density, the volume resistance of the pin-mill is lower than that of the ball-mill.

Figure 14:
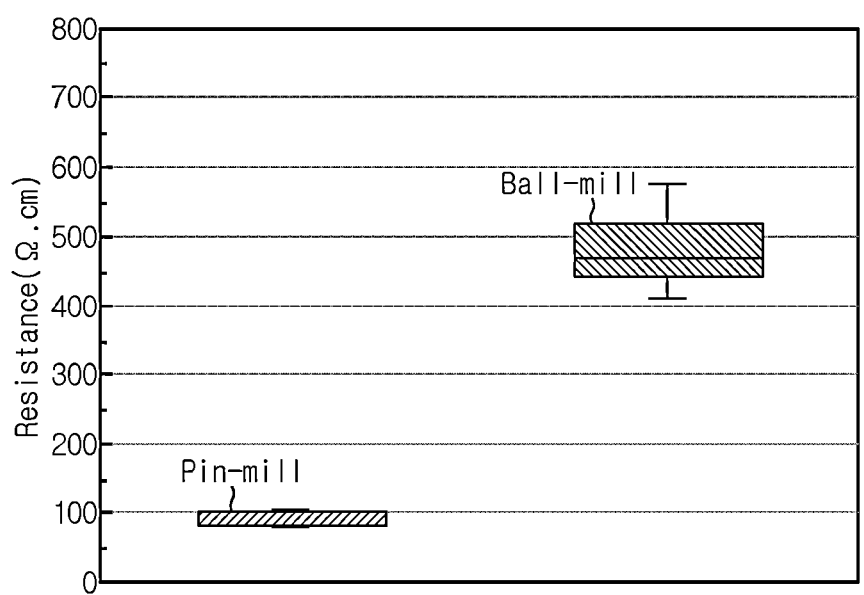
FIG. 14 is a graph showing the comparison of resistance of an electrode layer when a pin-mill and a ball-mill are used for dry milling.

FIG. 14 shows the comparison between the resistance of the electrode layer using the pin-mill and the resistance of the electrode layer using the ball-mill. When the pin-mill is used, the resistance is on a sufficient level for fabricating a lithium secondary battery, but when the ball-mill is used, the resistance is too high to use for a lithium secondary battery.

Since the current collector as a metal has malleability and ductility, the ball-mill that gives a strong force is not effective in the milling for separating the active material layer that is brittle. Accordingly, the ball-mill is difficult to separate the active material layer from the current collector, and there is a high possibility that the metal component of the current collector may remain in the milled products.

As shown in FIGS. 13 and 14, it is found that as a result of measuring the resistance of each of the powder and the electrode layer, the resistance of the powder and the electrode layer is much higher when the ball-mill is used than when the pin-mill is used. The current collector is not perfectly separated, and the current collector metal component, for example, Al, is coated on the surface of the active material layer, so when the active material layer flakes are reused, the resistance greatly increases. Accordingly, the ball-mill is not suitable for dry milling for electrode scrap reuse.

The present disclosure has been hereinabove described with a limited number of embodiments and drawings, the present disclosure is not limited thereto and it is obvious to those skilled in the art that a variety of modifications and changes may be made within the technical aspects of the present disclosure and the scope of the appended claims and their equivalents.

What is claimed is:

1. A method of reusing an electrode scrap, comprising:
   dry milling an electrode scrap remaining after punching an electrode sheet including an active material layer on a current collector to obtain milled products;
   screening active material layer flakes from current collector fragments in the milled products by sieving the milled products to produce screened active material layer flakes; and
   collecting the screened active material layer flakes to obtain reusable particles,
   wherein
   the screening comprises separating the active material layer flakes from the current collector fragments in the milled products stepwise according to size by sieving the milled products in a sequential order using a plurality of sieves having different mesh sizes; and
   the collecting comprises collecting smallest sized active material layer flakes and active material layer flakes that are at least one size bigger than the smallest sized active material layer flakes to obtain reusable particles.

2. The method according to claim 1, wherein the dry milling uses any one of a pin-mill, a disc-mill, a cutting-mill or a hammer-mill.

3. The method according to claim 1, wherein in the screening,
   the plurality of sieves is stacked, wherein each sieve of the plurality of sieves has a mesh size that gradually decreases from top to bottom,
   the milled products are fed into an uppermost sieve, and screening is performed under vibration applied to all the sieves by a vibrating motor.

4. The method according to claim 1, wherein the method further comprises reusing the smallest sized active material layer flakes and the active material layer flakes that are at least one size bigger than the smallest sized active material layer flakes.

5. The method according to claim 1, wherein the method comprises, before the dry milling, punching an electrode sheet including an active material layer on a current collector to a predetermined size.

6. The method according to claim 1, wherein the dry milling is conducted by a pin mill comprising a screen with opening, and the milled products pass through the openings.

7. A method of fabricating a recycled electrode, comprising:
   dry milling an electrode scrap remaining after punching an electrode sheet including an active material layer on a current collector to obtain milled products;

screening active material layer flakes from current collector fragments in the milled products by sieving the milled products to produce screened active material layer flakes;

collecting the screened active material layer flakes to obtain reusable particles; and using the reusable particles alone without composition adjustment, or in combination with a same slurry as a slurry used to form the active material layer to fabricate another electrode, wherein the screening comprises separating the active material layer flakes from the current collector fragments in the milled products stepwise according to size by sieving the milled products in a sequential order using a plurality of sieves having different mesh sizes; and the collecting comprises collecting smallest sized active material layer flakes and active material layer flakes that are at least one size bigger than the smallest sized active material layer flakes to obtain the reusable particles.

8. The method according to claim 7, wherein the dry milling uses any one of a pin-mill, a disc-mill, a cutting-mill or a hammer-mill.

9. The method according to claim 7, wherein the dry milling uses a pin-mill with a screen having an opening size of 0.1 to 1.9 mm.

10. The method according to claim 7, wherein in the screening, the plurality of sieves is stacked, wherein each sieve of the plurality of sieves has a mesh size that gradually decreases from top to bottom, the milled products are fed into an uppermost sieve, and screening is performed under vibration applied to all the sieves by a vibrating motor.

11. The method according to claim 7, wherein the screening comprises screening the active material layer flakes of more than 0 μm and 100 μm or less to obtain the usable particles.

12. The method according to claim 7, wherein the method further comprises reusing the smallest sized active material layer flakes and the active material layer flakes that are at least one size bigger than the smallest sized active material layer flakes.

* * * * *